(12) United States Patent
Jang et al.

(10) Patent No.: US 12,353,956 B2
(45) Date of Patent: Jul. 8, 2025

(54) ACTIVE CIRCULATOR AND QUANTUM COMPUTER SYSTEM WITH ACTIVE CIRCULATOR

(71) Applicant: Samsung Electronics Co., Ltd., Suwon-si (KR)

(72) Inventors: Taehwan Jang, Suwon-si (KR); Jinhyoun Kang, Sejong-si (KR); Hyeokshin Kwon, Seoul (KR); Jaeho Shin, Cheonan-si (KR); Jaehyeong Lee, Gwacheon-si (KR); Insu Jeon, Seoul (KR); Sungho Han, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 623 days.

(21) Appl. No.: 17/683,797

(22) Filed: Mar. 1, 2022

(65) Prior Publication Data
US 2023/0004849 A1    Jan. 5, 2023

(30) Foreign Application Priority Data

Jul. 2, 2021    (KR) .................. 10-2021-0087401

(51) Int. Cl.
*G06N 10/40*    (2022.01)
(52) U.S. Cl.
CPC .................. *G06N 10/40* (2022.01)
(58) Field of Classification Search
CPC ....................................... G06N 10/40
USPC ......................................... 716/100
See application file for complete search history.

(56) References Cited

U.S. PATENT DOCUMENTS

| | | | |
|---|---|---|---|
| 8,717,117 B2 | 5/2014 | Mung et al. | |
| 9,054,676 B2 | 6/2015 | Vickes et al. | |
| 9,455,486 B2 | 9/2016 | Chen et al. | |
| 9,641,156 B1 | 5/2017 | Kang et al. | |
| 9,735,776 B1* | 8/2017 | Abdo | H03K 17/92 |
| 2006/0208311 A1* | 9/2006 | Tomita | G06N 10/00 |
| | | | 257/321 |
| 2007/0207747 A1 | 9/2007 | Johnson et al. | |
| 2012/0063789 A1* | 3/2012 | Yuan | G01J 1/44 |
| | | | 250/214.1 |
| 2012/0212375 A1* | 8/2012 | Depree, IV | H01Q 15/0086 |
| | | | 977/762 |
| 2012/0274425 A1* | 11/2012 | Mung | H03F 3/195 |
| | | | 333/24 R |

(Continued)

FOREIGN PATENT DOCUMENTS

| | | |
|---|---|---|
| CN | 108539340 A | 9/2018 |
| KR | 10-2013-0037703 A | 4/2013 |
| KR | 10-2015-0004733 A | 1/2015 |

OTHER PUBLICATIONS

Shin, Shih-Chieh, et al. "A 1.5-9.6 GHz Monolithic Active Quasi-Circulator in 0.18 μm CMOS Technology." IEEE Microwave and Wireless Components Letters 18.12 (2008): 797-799.

(Continued)

*Primary Examiner* — Jack Chiang
*Assistant Examiner* — Suchin Parihar
(74) *Attorney, Agent, or Firm* — NSIP Law

(57) ABSTRACT

An active circulator includes: an active filter; and a power divider serially connected to the active filter, wherein three or more combinations of the active filter and the power divider are connected to form a loop.

26 Claims, 11 Drawing Sheets

(56) References Cited

U.S. PATENT DOCUMENTS

| | | |
|---|---|---|
| 2017/0186934 A1 | 6/2017 | Kwon et al. |
| 2018/0091141 A1* | 3/2018 | Abdo .................... G06N 10/00 |
| 2018/0137428 A1* | 5/2018 | Abdo ................... H10N 60/805 |
| 2018/0232653 A1* | 8/2018 | Selvanayagam ........ H01P 5/028 |
| 2019/0044668 A1* | 2/2019 | Elsherbini .............. G06N 10/00 |
| 2022/0059919 A1* | 2/2022 | Underwood ........... G06N 10/00 |
| 2022/0094029 A1* | 3/2022 | Richman .............. H10N 60/805 |
| 2022/0198313 A1* | 6/2022 | Mohiyaddin .......... G06N 10/40 |
| 2022/0207404 A1* | 6/2022 | Boothby ................ G06N 10/40 |

OTHER PUBLICATIONS

Mung, Steve WY, et al., "Active Three-Way Circulator Using Transistor Feedback Network." IEEE Microwave and Wireless Components Letters 27.5 (2017): 476-478.

\* cited by examiner

ACTIVE CIRCULATOR AND QUANTUM COMPUTER SYSTEM WITH ACTIVE CIRCULATOR

CROSS-REFERENCE TO RELATED APPLICATIONS

This application claims the benefit under 35 U.S.C. § 119(a) to Korean Patent Application No. 10-2021-0087401, filed on Jul. 2, 2021 in the Korean Intellectual Property Office, the entire disclosure of which is incorporated herein by reference for all purposes.

BACKGROUND

1. Field

The present disclosure relates to an active circulator and a quantum computer system with the active circulator.

2. Description of the Related Art

Quantum computers are special computers that perform high-speed computations by using the unique physical properties of quantum in quantum mechanics, and operate based on the quantum mechanical phenomena such as quantum superposition and quantum entanglement.

As a concept in contrast to traditional classical computers, quantum computers in a broad sense may include omnipotent quantum computers, non-omnipotent quantum computers, and non-classical computers. All of the omnipotent quantum computers, the non-omnipotent quantum computers, and the non-classical computers may perform computations using quantum mechanical phenomena in common, but they may be different in terms of the presence or absence of error tolerance for correcting an error occurring during computations or a high level of error tolerance.

Moreover, quantum computers may be classified into an omnipotent type using a quantum circuit and a quantum gate based on a quantum circuit model and a specialized type performing annealing computation based on a model called quantum annealing.

The quantum computer may perform computations in a minimum unit called a qubit, and a qubit element for performing computations in the unit of a qubit may be physically implemented on a board of the quantum computer. A bit used in an information storage element of a classical computer may have a state of 0 or 1, whereas a qubit may have states of 0 and 1 at the same time based on a superposition phenomenon, and qubits may interact based on entanglement instead of being independently controlled, such that $2^N$ information may be generated when N qubits are used.

Thus, as the number of qubits included in the quantum computer increases, the amount of information processible by the quantum computer may exponentially increase.

Quantum computation may be processed in the order of initializing a qubit, performing quantum gate computation or annealing computation, and then finally reading a computation result, and in particular, a status of quantum stored in a cavity of a qubit is likely to be broken, such that a function to prevent an error of quantum computation and correct an already occurring error may be required.

A quantum computer including 1,000 computing qubit elements may need one billion error-correcting qubit elements. Moreover, the mainstream of the quantum computers may use a superconductor, and thus, hardware or a methodology for stably performing signal transmission or power supply to a qubit element at an extremely low temperature around an absolute zero point may be desired.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an active circulator includes: an active filter; and a power divider serially connected to the active filter, wherein three or more combinations of the active filter and the power divider are connected to form a loop.

The power divider may include three ports.

The power divider may include one combining port and two dividing ports.

The active filter may include an operating amplifier and one or more capacitors.

The active filter may include an operating amplifier, one or more capacitors, and an attenuator.

Four pairs of the active filter and the power divider may be connected in series to form a loop.

The power divider may include a Wilkinson power divider comprising three ports.

In another general aspect, a quantum computer system includes: a power source; a quantum processor unit (QPU) configured to generate a control signal; the active circulator; and a quantum bit (qubit) element configured to selectively receive power from the power source via the active circulator and operate based on the control signal.

In another general aspect, a quantum computer system includes: a power source; a quantum processor unit (QPU) configured to generate a control signal; an active circulator comprising three or more pairs of an active filter and a power divider combined in series are connected to form a loop; and a plurality of quantum bit (qubit) elements configured to selectively receive power from the power source via the active circulator and operate based on the control signal.

The power divider may include three ports.

The power divider may include one combining port and two dividing ports.

The active filter may include an operating amplifier and one or more capacitors.

The active filter may include an operating amplifier, one or more capacitors, and an attenuator.

Four pairs of the active filter and the power divider may be connected in series to form a loop.

The power divider may include a Wilkinson power divider comprising three ports.

In another general aspect, a computer system includes: a power source; a processor configured to generate a control signal; an active circulator comprising three or more pairs of an active filter and a power divider combined in series are connected to form a loop; and a plurality of bit elements configured to selectively receive power from the power source via the active circulator and operate based on the control signal.

The power divider may include three ports.

The power divider may include one combining port and two dividing ports.

The active filter may include an operating amplifier and one or more capacitors.

The active filter may include an operating amplifier, one or more capacitors, and an attenuator.

Four pairs of the active filter and the power divider may be connected in series to form a loop.

In another general aspect, a quantum computer system includes: an active circulator comprising active filters and power dividers alternatively connected in series to form a loop; and a quantum bit (qubit) element configured to selectively receive power from the active circulator.

The loop including the active filters and the power dividers may have a rotational symmetry of an order of three or more.

The power dividers may include a first power divider, a second power divider adjacent to the first power divider in a direction of the loop, and a third power divider adjacent to the first power divider in another direction of the loop, and in response to an input of the power the first power divider, the active circulator may be configured to transmit the power to the second power dividers without transmitting the power to the third power divider.

The quantum computer system may include a quantum random access memory (QRAM) comprising a plurality of qubit elements including the qubit element.

The active filters and the power dividers may include three or more pairs of an active filter and a power divider connected in series to form the loop.

Other features and aspects will be apparent from the following detailed description, the drawings, and the claims.

Figure 1:
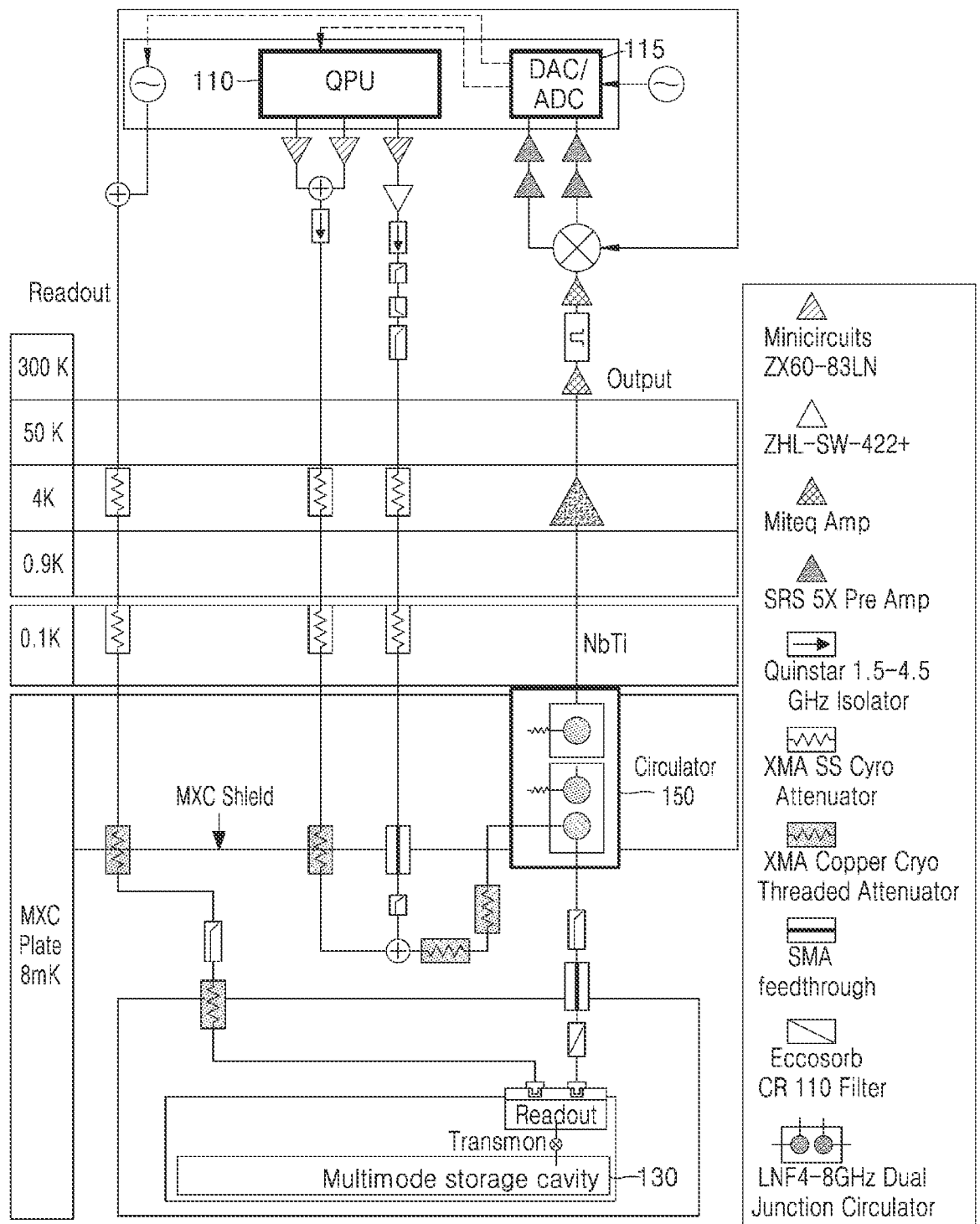
FIG. 1 is a conceptual diagram of an example of a quantum computer system according to one or more embodiments.

Throughout the drawings and the detailed description, unless otherwise described or provided, the same reference numerals refer to the same or like elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Reference will now be made in detail to embodiments, examples of which are illustrated in the accompanying drawings, wherein like reference numerals refer to like elements throughout. In this regard, the one or more embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Throughout the specification, it will be understood that when a component or element is referred to as being "on," "connected to" or "coupled to" another component or element, it may be directly on, connected to, or coupled to the other component or element, or there may be one or more intervening elements therebetween. In contrast, when a component or element is referred to as being "directly on," "directly connected to," or "directly coupled to" another component or element, there are no intervening components or elements present. Likewise, expressions, for example, "between" and "immediately between" and "adjacent to" and "immediately adjacent to" may also be construed as described in the foregoing.

Although terms of "first" or "second" are used to explain various members, components, regions, layers, or sections, the members, components, regions, layers, or sections are not limited to the terms. These terms should be used only to distinguish one member, component region, layer, or section from another member, component region, layer, or section. For example, a "first" member, component region, layer, or section referred to in examples described herein may also be referred to as a "second" member, component region, layer, or section, or similarly, and the "second" member, component region, layer, or section may be referred to as the "first" member, component region, layer, or section within the scope of the right according to the concept of the present disclosure.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, embodiments of the disclosure will be described in detail with reference to the attached drawings to allow those of ordinary skill in the art to easily carry out the embodiments of the disclosure after an understanding of the disclosure. However, the present invention may be implemented in various forms, and are not limited to the embodiments of the present invention described herein.

Hereinafter, exemplary embodiments of the present invention will be described in detail with reference to the accompanying drawings.

FIG. 1 is a conceptual diagram of an example of a quantum computer system according to one or more embodiments.

The quantum computer system of FIG. 1 is a schematically shown system that may implement a quantum bit (qubit) element using a superconductive material and operate based on quantum random access memory (QRAM).

In the left side of FIG. 1, information about a temperature of a material constituting a qubit element is expressed, showing that the temperature sequentially decreases from the room temperature 300 K (kelvin) to 8 mK (millikelvin) at which the material begins having superconductivity.

In the right side of FIG. 1, model examples of various elements (hardware) included in the quantum computer system shown in FIG. 1 are shown.

Referring to the model examples shown in FIG. 1, the quantum computer system of FIG. 1 may variously include an amplifier for amplifying a strength of a signal, an attenuator for reducing a strength of a signal while maintaining waveform characteristics of the signal, a circulator or isolator for passing a signal of a particular frequency in a direction, and a filter for removing a signal of a particular frequency.

An active circulator described in the present disclosure may perform a function of irreversibly passing power and/or a control signal supplied to a qubit element in one direction at an absolute temperature of 8 mK at which a material constituting the qubit element begins having superconductivity.

In FIG. 1, a quantum processing unit (QPU) 110 may store processing target information, generate a control signal (an instruction) for controlling various modules or elements constituting the quantum computer system, and perform quantum computation with support of QRAM, like a central processing unit (CPU) in a general computing system. The QPU 110 may be or include a processor.

A digital-to-analog converter (DAC)/analog-to-digital converter (ADC) 115 may convert an analog signal output from a sine wave generator into a digital signal or receive a digital signal output as a result of quantum computation and convert the received digital signal into an analog signal. As shown in FIG. 1, a signal output from the DAC/ADC 115 may be re-input to the QPU 110 which may analyze the input signal to obtain a result value of quantum computation.

A multimode storage cavity 130 may be a space where quantum is stored or removed in a quantum computation process, and may be physically implemented in QRAM (or an internal qubit element). Hereinbelow, the multimode storage cavity 130 may be abbreviated as the cavity 130.

In the quantum computer system, quantum information or quantum data may be stored in the cavity 130 in the form of photons. Movement of a quantum (e.g., a single photon) stored in the cavity 130 may be controlled through electromagnetic interaction between the qubit element and the cavity 130.

In the present disclosure, a methodology for electromagnetically controlling movement of quantum in the cavity 130 is based on a theory established in known circuit quantum electrodynamics (QED), and a theoretical description thereof will therefore be omitted.

In FIG. 1, in a state where the cavity 130 is manufactured such that a mode is generated in a desired frequency region, by causing the cavity 130 and the qubit element to be coupled, control over the qubit element may be control over a quantum (e.g., a single photon) stored or to be stored in the cavity 130, such that the quantum may be stored in the desired (e.g., determined) mode and/or the stored quantum may be removed.

In a typical quantum computer system, to control a qubit as described above in a quantum computer system including a qubit element without using QRAM, three lines are required for each qubit. Three lines connected to the qubit may include a line through which a radio frequency (RF) signal passes and a line through which direct current (DC) power is transmitted, and, for example, to control 10 qubits, a total of 30 lines are required.

In contrast to the typical quantum computer system, in the quantum computer system of one or more embodiments based on QRAM as shown in FIG. 1, even when ten or more quantum states are stored, just three control lines may be used, such that the quantum computer system of one or more embodiments may achieve a hardware resource reduction effect of 90% or more when compared to the typical quantum computer system that is not based on QRAM, in a situation where the same amount of quantum states are controlled.

The quantum computer system may include several tens of qubits or more to perform high-speed quantum computation, such that by further reducing the number of lines connected to each QRAM from three lines, the complexity of hardware may be greatly reduced and improved. A quantum computer system of one or more embodiments is an improvement even over a typical QRAM-based quantum computer system, by including an active circulator 150 configured for the quantum computer system in QRAM and/or by arranging the active circulator 150 adjacent to the QRAM.

Figure 2:
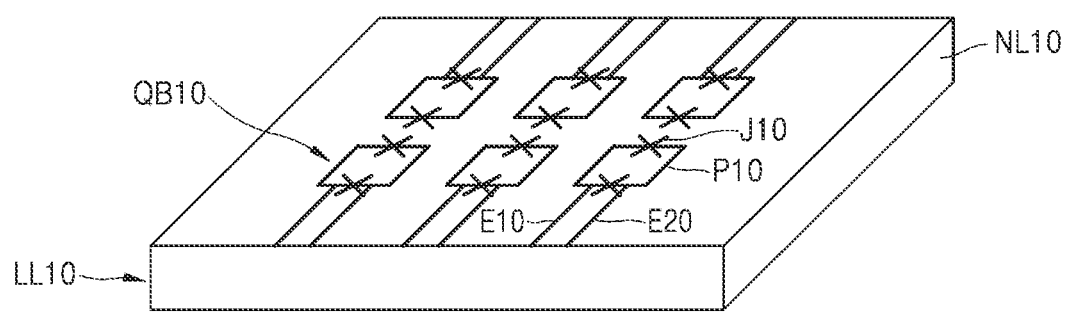
FIG. 2 schematically shows a multi-qubit element included in a quantum computer system according to one or more embodiments.
Figure 2:
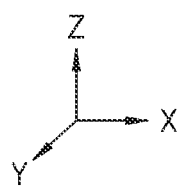

FIG. 2 schematically shows a multi-qubit element included in a quantum computer system according to one or more embodiments.

Referring to FIG. 2, a multi-qubit element may be implemented through a scheme where a plurality of qubits QB10 are arranged in a structure LL10. The structure LL10 may include an insulating layer NL10 and the plurality of qubits QB10 may be arranged thereon. The plurality of qubits QB10 may be arranged two-dimensionally.

Although a total of six qubits are shown in FIG. 2, an arrangement method and the number of qubits QB10 shown in FIG. 2 are merely examples, and may vary with an embodiment of the present disclosure (e.g., there may be less or more than six qubits, according to other non-limiting examples).

In addition, while a plurality of qubits are arranged on one structure LL10 in FIG. 2, there may be a plurality of structures LL10 constituting the quantum computer system, and a structure other than the structure LL10 of FIG. 2 may be arranged extended in one or more directions of an X axis, a Y axis, and a Z axis with respect to the structure LL10 shown in FIG. 2.

The qubit QB10 of FIG. 2 may be a superconducting qubit using a superconductor. In this case, the qubit QB10 may include a loop structure P10 formed as a superconductor. The loop structure P10 may be a closed loop structure.

The qubit QB10 may further include at least one Josephson junction J10 provided on the loop structure P10. The Josephson junction J10 may include two superconductors and a dielectric layer provided therebetween. To facilitate identification, the dielectric layer included in the Josephson junction J10 may be shown by being symbolized as an X in FIG. 2.

Although it is illustrated in FIG. 2 that two Josephson junctions J10 are formed for every qubit QB10, the number of Josephson junctions J10 formed for every qubit QB10 may differ, according to non-limiting examples. Moreover, a position at which the Josephson junction J10 is formed in each qubit QB10 may differ, according to non-limiting examples.

A superconducting material constituting the qubit QB10 may be any one of aluminum (Al), niobium (Nb), and lead (Pb), as non-limiting examples. The superconducting material constituting the qubit QB10 may be an alloy of any one of Al, Nb, and Pb, and another metal, as non-limiting examples. For example, in FIG. 1, it has been described that niobium titanium (NbTi) that is a superconducting material is used and thus superconductivity is observed at an absolute temperature of 8 mK.

In the qubit QB10 in a superconducting state, a quantum may move without resistance. When the quantum controlled in the qubit QB10 is an electron, superconducting current may flow. For example, a cooper pair including two electrons may rotate the loop structure P10 without resistance.

In this case, the cooper pair may tunnel the Josephson junction J10, and generate superconducting current regardless of a tunneling barrier. The state of the qubit QB10 may be determined depending on a position or a state of the cooper pair.

In FIG. 2, a first electrode line E10 and a second electrode line E20 may be provided which extend in directions parallel to each other in a side of each loop structure P10. For example, the first electrode line E10 and the second electrode line E20 may extend in a direction parallel to a Y axis.

The first electrode line E10 and the second electrode line E20 may have a wiring structure for applying an electrical signal to the qubit QB10.

As shown in FIG. 2, an interval between the first electrode line E10 and the second electrode line E20 may be less than a width measured in an X-axis direction of the loop structure P10. The first electrode line E10 and the second electrode line E20 may be formed of a superconducting material such as Al, Nb, Pb, NbTi, etc. The first electrode line E10 and the second electrode line E20 may be formed of the same material as the loop structure P10, and may be formed in the same level (height) as the loop structure P10.

Figure 3:
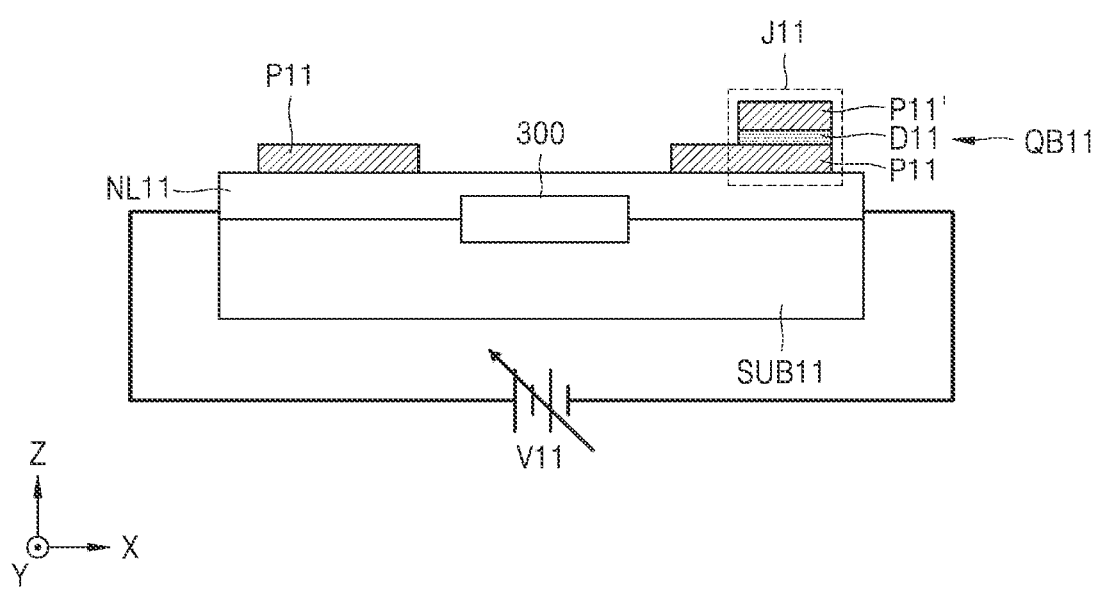
FIG. 3 schematically shows an example of a cross-sectional structure of a multi-qubit element according to one or more embodiments.

FIG. 3 schematically shows an example of a cross-sectional structure of a multi-qubit element (e.g., the multi-qubit element described with reference to FIG. 2) according to one or more embodiments.

FIG. 3 shows a cross-sectional structure of a multi-qubit element further including a power source V11 and an active circulator 300 in comparison to FIG. 2. In FIG. 3, a substrate SUB11 may include an insulating material having a high quality factor called a Q value. The high quality factor of the substrate SUB11 may minimize an influence upon a coherence factor of the qubit QB11. For example, as the substrate SUB11, a sapphire substrate or silicon (Si) substrate may be used.

An insulating layer NL11 may be formed of silicon oxide or silicon nitride. The insulating layer NL11 may be formed of a dielectric material having a higher dielectric constant than that of the silicon nitride.

As described with reference to FIG. 2, the qubit QB11 may be provided on the insulating layer NL11. The qubit QB11 may include the loop structure P11 formed of a superconducting material, and may further include at least one Josephson junction J11 formed in the loop structure P11. The Josephson junction J11 may include two superconductors (a part of P11 and P11') and a dielectric layer D11 provided therebetween.

While the Josephson junction J11 stacked in a Z-axis direction is shown in FIG. 3, the Josephson junction J11 may be implemented where the dielectric layer D11 is disposed at the same height as the loop structure P11, as described with reference to FIG. 2. The superconducting material included in the loop structure P11 and the Josephson junction J11 may be Al, Nb, Pb, NbTi, etc. The dielectric layer D11 may be, for example, aluminum oxide ($Al_2O_3$), but may be changed variously without being limited thereto.

The multi-qubit element of FIG. 3 may include the active circulator 300. For example, when the substrate SUB11 is a silicon substrate, an insulating film such as a silicon oxide layer ($SiO_2$) may be formed on a surface of the substrate SUB11 and the active circulator 300 may be arranged on the insulating film. The active circulator 300 of one or more embodiments may not need a permanent magnet unlike a typical circulator including a ferrite material, thus being easily miniaturized. When the active circulator 300 of one or more embodiments is easily miniaturized, it may mean that it is configured to implement the entire system including the active circulator 300 as a single chip by using a system on chip (SoC).

In FIG. 3, the active circulator 300 may be included in the multi-qubit element or arranged adjacent to the multi-qubit element to selectively supply power of the power source V11 supplied to the multi-qubit element to some qubit elements and/or irreversibly pass a control signal having a certain frequency, thereby involving an operation control of the multi-qubit element. Non-limiting examples of structural characteristics, operating characteristics, and functional effects of the active circulator 300 will be described in detail with reference to FIGS. 5 through 11.

While the power source V11 is illustrated as a variable voltage source form in FIG. 3, this illustration is merely for convenience of a description, and the power source V11 is not limited to a special form. For example, the power source V11 may include any form of a power source configured to supply power to a qubit element through a line arranged on the substrate SUB11.

Figure 4:
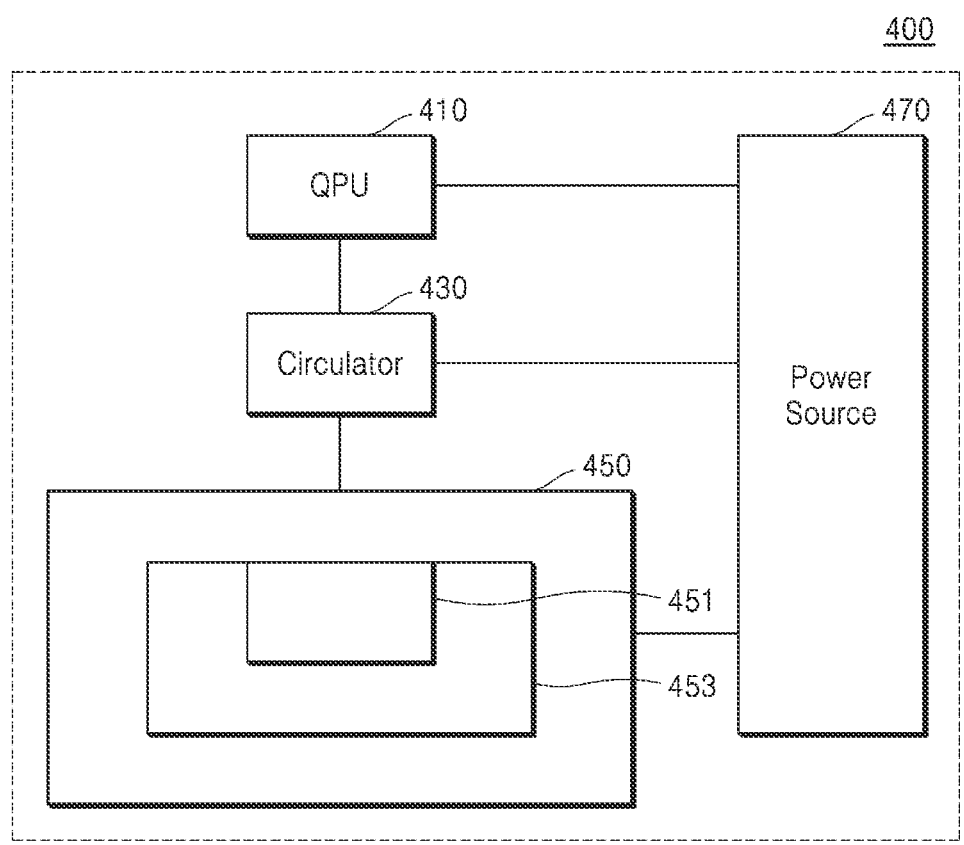
FIG. 4 is a block diagram showing an example of a quantum computer system according to one or more embodiments.

FIG. 4 is a block diagram showing an example of a quantum computer system (e.g., the quantum computer system described with reference to FIGS. 1 through 3) according to one or more embodiments.

Referring to FIG. 4, a quantum computer system 400 according to the present disclosure may include a QPU 410, a circulator 430, QRAM 450, and a power source 470. FIG. 4 shows main components required for clearly describing characteristics of the quantum computer system 400 according to the present disclosure, in which the quantum computer system 400 implemented actually may include other components in addition to the components shown in FIG. 4. The quantum computer system 400 shown in FIG. 4 may be regarded as a sort of QRAM-based quantum computer system as described with reference to FIG. 1.

The QPU 410 may control the quantum of the QRAM 450 or generate a control signal for controlling various modules included in the quantum computer system 400. The QPU 410 may perform a series of processes of initializing qubits implemented in the QRAM 450 based on a user input to the quantum computer system 400, performing quantum computation, and outputting a result of computation, as a whole.

The circulator 430 may be an irreversible module that selectively adjusts power supplied to the QRAM 450 in a process of supplying power of the power source 470 to various modules. The circulator 430 may also perform a function of passing a signal of a certain frequency in one direction, in which the signal may include the control signal of the QPU 410.

The circulator 430 may not include a ferrite material unlike a typical circulator, and thus may not include a permanent magnet for introducing magnetization of the ferrite material. The circulator 430 may be implemented in a form in which at least three pairs of an active filter and a power divider combined in series are connected to form a loop. Non-limiting examples of a combining form, structural characteristics, etc., of the active filter and the power divider included in the circulator 430 will be described later with reference to FIGS. 5 and 6.

The QRAM 450 may provide a storage space for assisting quantum computation of the QPU 410 and include a plurality of qubit elements. A cavity 451 (e.g., a multimode storage cavity) that is a space for storing quantum may be implemented in the QRAM 450, and the cavity 451 may correspond to each qubit element 453.

A minimum unit of computation in the quantum computer system 400 may be a qubit, and quantum computation may be performed in the unit of a qubit through control of the qubit element 453 implemented physically. For example, in the QRAM 450, quantum information may be stored in the cavity 451 in the form of a photon. The cavity 451 may be manufactured and configured to generate a mode in a desired frequency region, and based on the foregoing cavity characteristics, the cavity 451 of FIG. 4 has been referred to as the multi-mode storage cavity 130 in FIG. 1 and described.

After the cavity 451 and the qubit element 453 are coupled in a preset frequency region, quantum computation may be performed in the unit of a qubit such that a photon may be stored in the cavity 451 or removed from the cavity 451. While one cavity 451 and one qubit element 453 are shown in FIG. 4, this is merely intended to clarify a description, and as described with reference to FIGS. 2 and 3, the quantum computer system 400 may include several thousands of qubits or more and as many cavities 451 as the qubits.

The power source 470 may supply power to each module constituting the quantum computer system 400. The power supplied by the power source 470 may be selectively supplied to the qubit element 453 constituting the QRAM 450 by the circulator 430.

Figure 5:
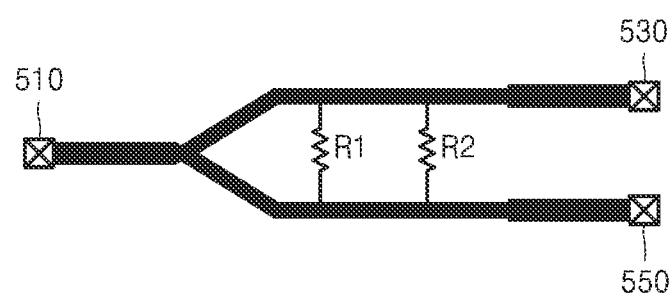
FIG. 5 schematically shows a circuit diagram of a power divider that is a component of a circulator according to one or more embodiments.

FIG. 5 schematically shows a circuit diagram of a power divider that is a component of a circulator according to one or more embodiments.

The power divider of FIG. 5 may be a 3-port power divider including a port 1 510, a port 2 530, a port 3 550, a resistor R1, and a resistor R2. In FIG. 5, the port 1 510 may be a combining port, and the port 2 530 and the port 3 550 may be dividing ports.

The power divider of FIG. 5 may operate as a power combiner in light of the port 2 530 and the port 3 550. For example, a signal applied to the port 2 530 and the port 3 550 may be output by being combined with the port 1 510, and the port 2 530 and the port 3 550 may be isolated from each other, such that a signal component applied to the port 2 530 may be output from the port 3 550 or a signal component applied to the port 3 550 may not be output from the port 2 530.

Characteristics of the power divider of FIG. 5 may be expressed as a scattering (s)-parameter as shown in Equation 1 below, for example.

$$[S_{PD}] = \begin{bmatrix} 0 & -j/\sqrt{2} & -j/\sqrt{2} \\ -j/\sqrt{2} & 0 & S_{23,PD} \\ -j/\sqrt{2} & S_{32,PD} & 0 \end{bmatrix} \quad \text{Equation 1}$$

Equation 1 expresses the characteristics of the power divider of FIG. 5 as the s-parameter.

In Equation 1, $S_{PD}$ may be the s-parameter of the power divider, and $S_{32,PD}$ and $S_{23,PD}$ may be result values of expressing isolation between the port 2 and the port 3 in the power divider as an equation. The s-parameter means a ratio of a measured input voltage to an output voltage in a frequency region, and may directly express operating characteristics in which a specific electrical element operates upon input of an electrical signal in a normal state. According to an embodiment, the power divider according to the present disclosure may be a 'Wilkinson power divider'.

Another component for forming a circulator according to the present disclosure may be an active filter. The active filter may be a filter having a gain, i.e., an input/output ratio of a signal, which is constant, and operating in the presence of a power source providing current or voltage to a separate element constituting the filter, and the active filter according to the present disclosure may be implemented in a form where an operating amplifier (OP-Amp) and a capacitor are combined.

According to an embodiment, the active filter may further include an attenuator in addition to the OP-Amp and the capacitor. As the active filter of the present disclosure, CMA 83LN or CMA 83LN+ produced in mini-circuits may be used. In the present disclosure, the active filter may not be limited to a special structure or element as long as the active filter may include a certain number of ports and function as an isolator that does not pass a signal in an opposite direction to a first direction while passing the signal in the first direction.

$$[S_{AF}] = \begin{bmatrix} 0 & S_{12,AF} \\ S_{21,AF} & 0 \end{bmatrix} \quad \text{Equation 2}$$

Equation 2 expresses the s-parameter of the active filter as an equation. In Equation 2, $S_{AF}$ may be the s-parameter of the active filter, and $S_{12,AF}$ and $S_{21,AF}$ may be values mathematically expressing functional characteristics of respective active filters. For convenience, impedances of input terminals of active filters may be regarded as all matching to 50 ohms.

Figure 6:
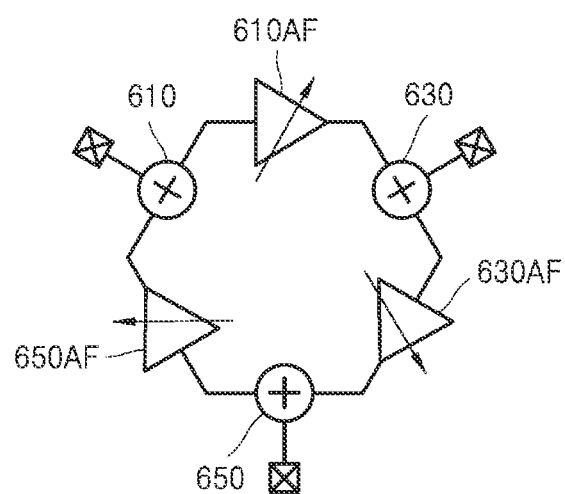
FIG. 6 is a circuit diagram of an active circulator according to one or more embodiments.

FIG. 6 is a circuit diagram of an active circulator according to one or more embodiments.

Referring to FIG. 6, an active circulator according to the present disclosure may be implemented in which three power dividers (first through third power dividers) 610, 630, and 650 and three active filters 610 AF, 630 AF, and 650 AF alternately form a loop, and one port protrudes outwardly for connection with other elements in each of the three power dividers 610, 630, and 650.

For example, one active filter and one power divider may be serially connected to form a pair, and three pairs may be serially connected to form a closed loop, thus forming the active circulator shown in FIG. 6.

In the active circulator shown in FIG. 6, each power divider may be the power divider described with reference to FIG. 5, which has three ports, such that the two ports of each power divider may be electrically connected respectively to an input terminal and an output terminal of an adjacent active filter and the other one port may be a port of the active circulator and thus may be electrically connected to another module constituting a quantum computer system.

The active circulator shown in FIG. 6 may be a 3-port (or three-direction) active circulator, in which a port of the active circulator adjacent to the first power divider 610 may be a port 1, a port of the active circulator adjacent to the second power divider 630 may be a port 2, and a port of the active circulator adjacent to the third power divider 650 may be a port 3.

The 3-port active circulator of FIG. 6 may transmit a signal in a clockwise direction according to layout characteristics of the active filters and the power dividers. For example, in the 3-port active circulator of FIG. 6, upon input of power (a signal) to the port 1, the power (the signal) may be transmitted to the port 2 located adjacent in the clockwise direction without being transmitted to the port 3.

Due to a structure of the active filter or the layout direction of the power divider, a transmission direction of a signal may be opposite (a counterclockwise direction) to the direction described above, according to a non-limiting example. Moreover, as shown in FIG. 1, to assist an operation of the active circulator, the active circulator according to the present disclosure may be implemented in a form in which an isolator having certain specifications is added.

$$[S_{AC}] = \quad \text{Equation 3}$$

$$\begin{bmatrix} 0 & \frac{1}{2}S_{21,AF}^2 S_{32,PD} + \frac{1}{2}S_{12,AF} & \frac{1}{2}S_{12,AF}^2 S_{23,PD} + \frac{1}{2}S_{21,AF} \\ \frac{1}{2}S_{12,AF}^2 S_{23,PD} + \frac{1}{2}S_{21,AF} & 0 & \frac{1}{2}S_{21,AF}^2 S_{32,PD} + \frac{1}{2}S_{12,AF} \\ \frac{1}{2}S_{21,AF}^2 S_{32,PD} + \frac{1}{2}S_{12,AF} & \frac{1}{2}S_{12,AF}^2 S_{23,PD} + \frac{1}{2}S_{21,AF} & 0 \end{bmatrix}$$

Equation 3 expresses characteristics of the active circulator shown in FIG. 6 as the s-parameter. In Equation 3, $S_{AC}$ may be the s-parameter of the active circulator, and $S_{12,AF}$, $S_{21,AF}$, $S_{32,PD}$, and $S_{23,PD}$ may be characteristic values of the power divider and the active filter described with reference to Equation 1 and Equation 2.

For example, the s-parameter of Equation 3 may be a result of computing the s-parameters of the power divider and the active filter described in Equation 1 and Equation 2 in combination based on a circuit configuration (the closed loop and the serial connection) of the active circulator shown in FIG. 6. When comparing mathematical sizes, $S^2_{12,AF}S_{23,PD}$ may be negligibly smaller than $S_{21,AF}$, and thus may be omitted by being regarded as 0, such that Equation 3 may be simplified into Equation 4 below, for example.

$$[S_{AC}] = \begin{bmatrix} 0 & \frac{1}{2}S_{21,AF}^2 S_{32,PD} + \frac{1}{2}S_{12,AF} & \frac{1}{2}S_{21,AF} \\ \frac{1}{2}S_{21,AF} & 0 & \frac{1}{2}S_{21,AF}^2 S_{32,PD} + \frac{1}{2}S_{12,AF} \\ \frac{1}{2}S_{21,AF}^2 S_{32,PD} + \frac{1}{2}S_{12,AF} & \frac{1}{2}S_{21,AF} & 0 \end{bmatrix}$$

Equation 4

Equation 4 may show a result of simplifying the s-parameter of the active circulator described with reference to FIG. 6. When an isolation of the active circulator is calculated based on Equation 4, a result like Equation 5 below may be obtained, for example, and when a transmission coefficient of the active circulator is calculated based on Equation 4, then a result like Equation 6 below may be obtained, for example.

$$\text{Isolation}_{AC} = \frac{S_{21,AF}}{S_{21,AP}^2 S_{32,PD} + S_{12,AF}} \quad \text{Equation 5}$$

$$\text{Trans. Coeff.}_{Ac} = \frac{1}{2}S_{21,AF} \quad \text{Equation 6}$$

Isolation$_{AC}$ may be the isolation of the active circulator in Equation 5, and Trans.Coeff.$_{AC}$ may be the transmission coefficient of the active circulator in Equation 6.

As the isolations of the active filter and the power divider included in the active circulator are designed high, the isolation of the active circulator may be improved. In addition, as the transmission coefficient of the active filter is low, the isolation of the active circulator may be improved.

However, considering a correlation that the transmission coefficient of the active circulator is low as the transmission coefficient of the active filter is low, eventually, as the transmission coefficient of the active filter is lowered, the isolation of the active circulator may be improved and at the same time, the transmission coefficient of the active circulator may be lowered, forming a trade-off relationship between the isolation of the active circulator and the transmission coefficient of the active circulator.

For this reason, to secure the isolation and transmission coefficient of the active circulator to be a certain value or higher, the transmission coefficient of the active filter included in the active circulator may be properly adjusted, and the number or structural characteristics of active elements and passive elements included in the active filter may also be determined based on the adjusted transmission coefficient.

Figure 7:
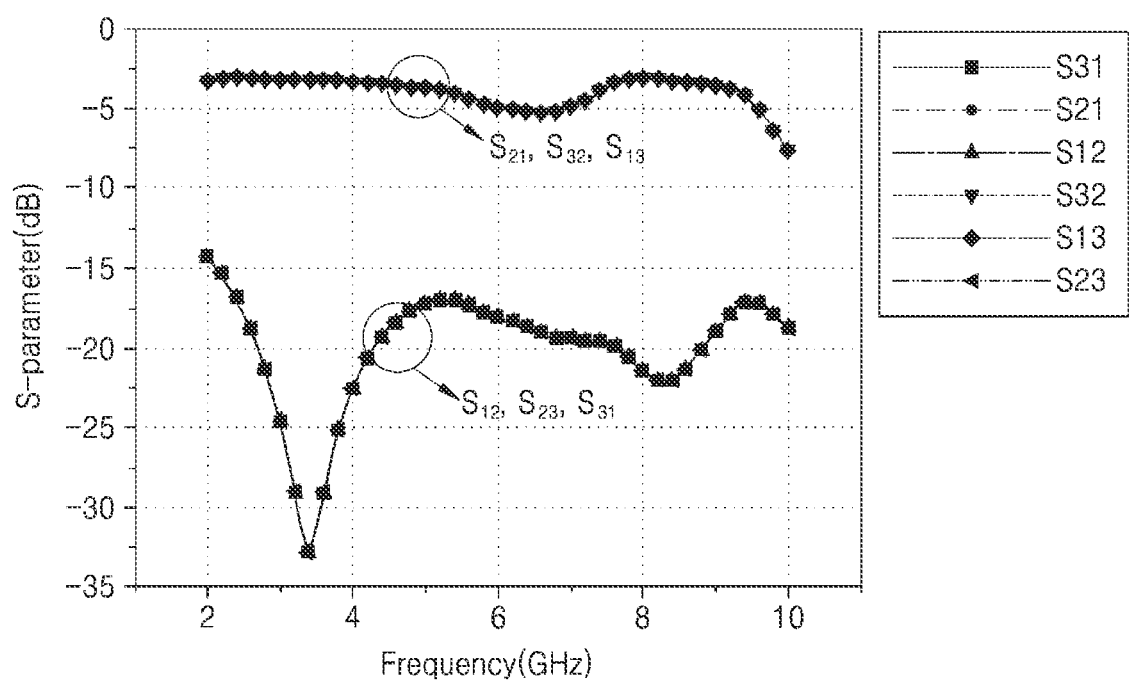
FIG. 7 is a graph showing circuit characteristics of a 3-port active circulator according to one or more embodiments.

FIG. 7 is a graph showing circuit characteristics of a 3-port active circulator according to one or more embodiments.

FIG. 7 is a graph showing a correlation between a frequency and an s-parameter of the 3-port active circulator described with reference to FIG. 6. FIG. 7 shows circuit characteristics of the 3-port active circulator having three ports in which a loop is formed by serially connecting an active filter with an input impedance of 50Ω and a power divider of a Wilkinson structure described in FIG. 5.

First, $S_{21}$, $S_{32}$, and $S_{13}$ represent s-parameters of a graph in an upper portion of FIG. 7, each indicating a feature in which a signal passes in a forward (clockwise) direction. For example, $S_{21}$ may indicate a feature in which a signal passes from a port 1 to a port 2 in the 3-port active circulator, and $S_{32}$ may indicate a feature in which a signal passes from the port 2 to a port 3 in the 3-port active circulator.

The 3-port active circulator according to the present disclosure is structured to have symmetry due to a feature of being implemented in a way that the active filter and the power divider are serially combined to form a loop, such that the general shapes of the graphs of $S_{21}$, $S_{32}$, and $S_{13}$ are all the same. That is, a feature in which $S_{21}$, $S_{32}$, and $S_{13}$ are the same or substantially the same regardless of a frequency change in FIG. 7 may be a result based on the symmetric structure of the active circulator.

On the other hand, $S_{12}$, $S_{23}$, and $S_{31}$ may represent s-parameters of a graph arranged in a lower portion of FIG. 7. $S_{12}$, $S_{23}$, and $S_{31}$ may show a feature in which a signal is blocked in a reverse (counterclockwise) direction. For example, $S_{12}$ may be a result of expressing, as an s-parameter, a feature in which a signal is blocked from the port 2 to the port 1 in the 3-port active circulator, and due to the symmetric structure of the active circulator, $S_{12}$, $S_{23}$, and $S_{31}$ all may have the same value.

An average gap between the two s-parameter graphs shown in FIG. 7 may be interpreted as the isolation of the 3-port active circulator, and according to FIG. 7, it may be interpreted that an isolation of about 14 dB is secured in a band of about 2.4 to about 9.6 GHz. Moreover, the transmission coefficient of the active circulator calculated according to Equation 5 and Equation 6 may be about −3 dB.

Figure 8:
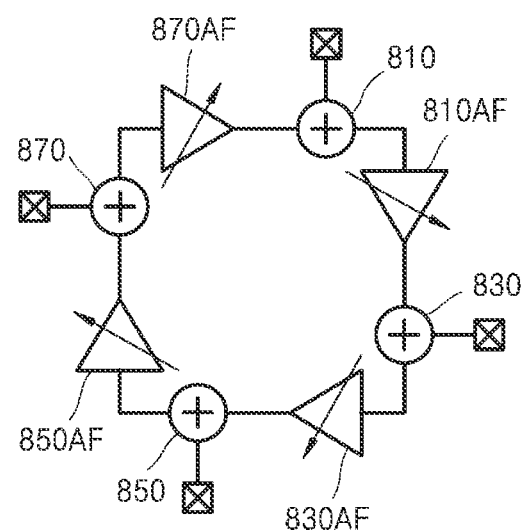
FIG. 8 is a circuit diagram of a 4-port active circulator according to one or more embodiments.

FIG. 8 is a circuit diagram of a 4-port active circulator according one or more embodiments.

Referring to FIG. 8, a 4-port active circulator according to the present disclosure may be implemented in which four power dividers (first through fourth power dividers) 810, 830, 850, and 870 and four active filters 810AF, 830 AF, 850 AF, and 870 AF alternately form a loop, and one port protrudes outwardly for connection with other elements in each of the four power dividers 810, 830, 850, and 870.

For example, one active filter and one power divider may be serially connected to form a pair, and four pairs may be serially connected to form a closed loop, thus forming the 4-port active circulator shown in FIG. 8.

In the active circulator shown in FIG. 8, each power divider may be the power divider described with reference to FIG. 5, which has three ports, such that the two ports of each power divider may be electrically connected respectively to an input terminal and an output terminal of an adjacent active filter and the other one port may be a port of the active circulator and thus may be electrically connected to another module constituting a quantum computer system.

Figure 9:
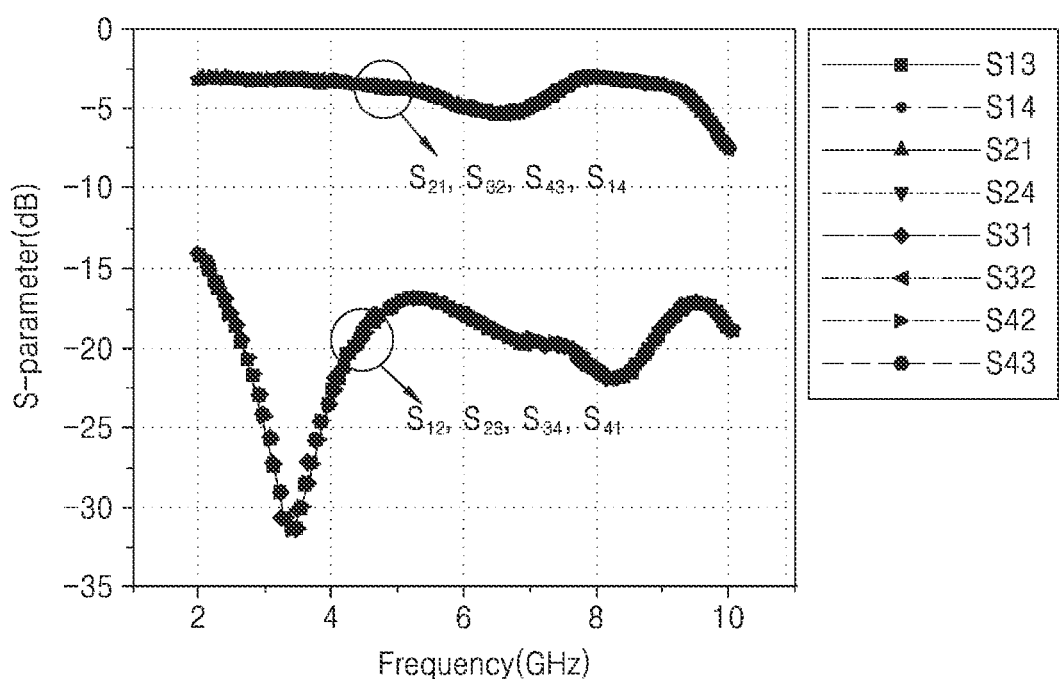
FIG. 9 is a graph showing circuit characteristics of a 4-port active circulator according to one or more embodiments.

FIG. 9 is a graph showing circuit characteristics of a 4-port active circulator according to one or more embodiments.

Comparing FIG. 9 with FIG. 7, it is shown that even when the 4-port active circulator is configured by further adding one active filter and one power divider to the 3-port active circulator, the feature in which signal transmission in the reverse direction is blocked in a broad band (2.4 to 9.6 GHz) may still be maintained.

Figure 10:
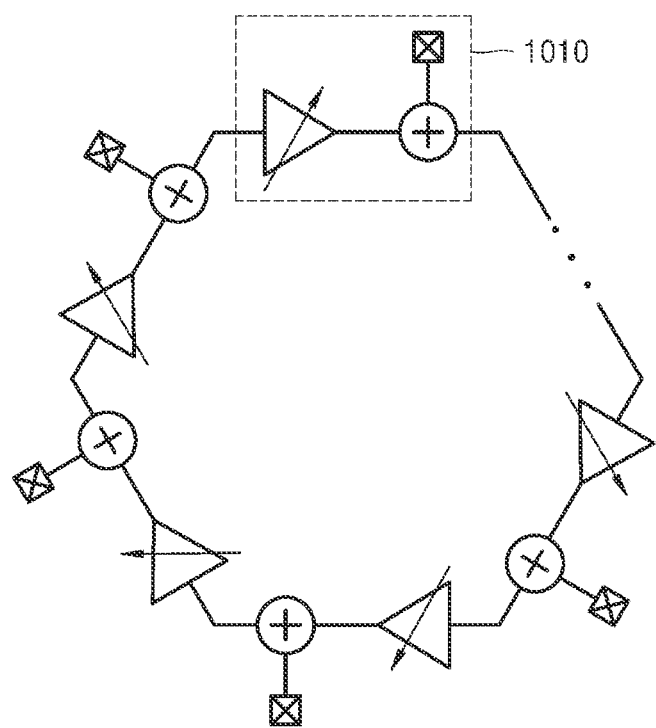
FIG. 10 is a circuit diagram of an n-port active circulator according to one or more embodiments.

FIG. 10 is a circuit diagram of an n-port active circulator according to one or more embodiments.

Referring to FIG. 10, one active filter and one power divider may be serially combined to form a pair 1010, and n pairs may be serially connected to form a loop, such that an n-port active circulator such as a 3-port or 4-port active circulator may be completed. When the n-port active circulator maintains the characteristics of the active filter and the power divider, the n-port active circulator may also operate identically or extremely similarly to the 3-port or 4-port active circulator.

Figure 11:
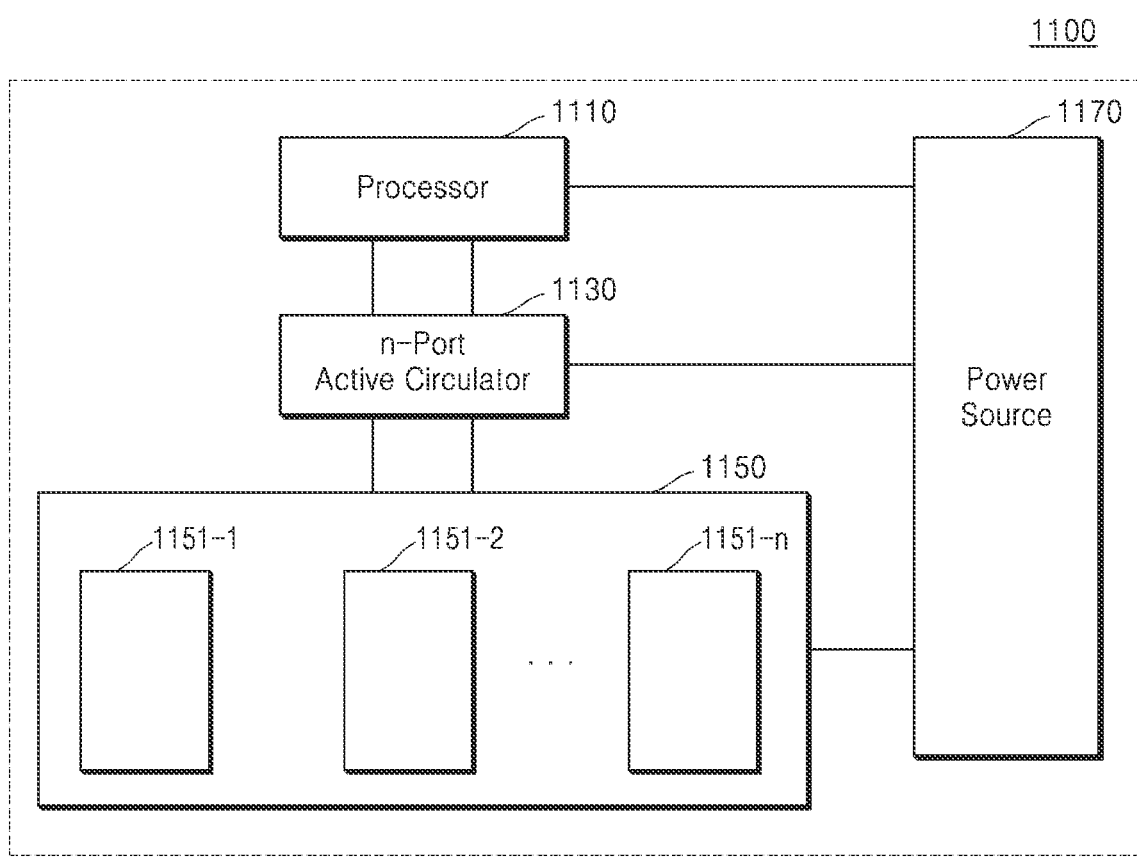
FIG. 11 is a block diagram of an example of a computer system including an active circulator according to one or more embodiments.

FIG. 11 is a block diagram of an example of a computer system including an active circulator according to one or more embodiments.

Referring to FIG. 11, a computer system 1100 according to the present disclosure may include a processor 1110, an n-port active circulator 1130, a memory 1150, and a power source 1170. FIG. 11 shows main components required for clearly describing characteristics of the computer system 1100 according to the present disclosure, in which the computer system 1100 implemented actually may include other components in addition to the components shown in FIG. 11.

FIG. 11 is a view for describing that the computer system 1100 of FIG. 11 has wide extendability to the extent that the active circulator according to the present disclosure may be adopted in a general computer system as well as a quantum computer system.

The processor 1110, which is a central processing unit (CPU) generally included in a computer, may perform a series of processes of generating a control signal for controlling various modules included in the computer system 1100 and processing data.

The n-port active circulator 1130 may be the n-port active circulator described with reference to FIG. 10, and may have a structure in which an active filter and a power divider are serially combined to form a pair and n pairs are serially connected to form a loop. The n-port active circulator 1130 may be connected to n bit elements included in the memory 1150, and may transmit power (a signal) in the forward direction according to a unique function of the circulator (n-port active circulator 1130) when the power (the signal) is applied to a particular port. Herein, n may be an integer that is greater than or equal to 3.

The memory 1150, which is a module for providing a storage space in which data of computation processed by the processor 1110 is temporarily or permanently stored, may include n bit elements 1151-1 through 1151-$n$ internally.

The power source 1170 may perform a function of supplying power to various modules included in the computer system 1100. In a process where the power source 1170 supplies power to a module included in the computer system 1100, the n-port active circulator 1130 may operate to cut off power to some modules according to a port number connected to the power source 1170.

The active circulator described with reference to FIGS. 1 through 11 may be manufactured in a way that the active filter and the power divider are serially connected to form a pair and pairs are connected to form a loop.

The active circulator according to the present disclosure may be easily miniaturized, unlike a typical circulator in which a permanent magnet including a ferrite material is necessarily included. When the operating frequency of the typical circulator including the ferrite material increases, a biasing field required for an operation of the typical circulator becomes stronger, and thus a permanent magnet having a strong magnetic force is necessary for the circulator, and generally, the magnetic force of the magnet is proportional to the size of the magnet, such that the circulator including the ferrite material is limited in miniaturization. In contrast, the active circulator of one or more embodiments may be easily miniaturized, and thus the active circulator of one or more embodiments may be manufactured as a single chip through an on-chip or on-board (printed circuit board (PCB)) scheme.

The active circulator of one or more embodiments may have a loop form, and thus may be symmetric to all ports due to a symmetric structure. For example, 3-port active quasi circulators manufactured using the active filters may have asymmetric characteristics because a signal is transmitted from the port 2 to the port 3 or from the port 2 to the port 1, but a signal from the port 1 to the port 3 is blocked, whereas the active circulator of one or more embodiments may operate as a circulator due to a symmetric structure regardless of a port.

Moreover, the active circulator of one or more embodiments may be implemented by combining the active filter having a gain or a transmission coefficient that is easily adjustable with the power divider, such that by adjusting the gain or the transmission coefficient of the active filter, the active circulator having proper isolation and transmission coefficient may be implemented. That is, the active filter may be manufactured based on a variable gain amplifier, such that the active circulator having narrow band or broad band characteristics may be easily manufactured.

Moreover, the active circulator of one or more embodiments may be applied to a controller for quantum computation. When the active circulator according to the present disclosure is applied to a QRAM-based quantum computer, one more line necessary for QRAM may be reduced, thus reducing a hardware resource and significantly improving hardware complexity.

The active circulator of one or more embodiments is extendable (wide extendability) from three ports to n ports, thus functioning as a module for selectively blocking power or a signal in a general computer system as well as a quantum computer system and at the same time, being configured to transmit/receive, thereby being applicable to a wideband full duplex radio system with a double-improved spectral efficiency.

The circulator of one or more embodiments may be easy to miniaturize when compared to the typical circulator including the ferrite material.

Moreover, the circulator of one or more embodiments may have a symmetric structure, thus implementing the same isolation for each port.

The circulator of one or more embodiments may implement high isolation in a broad band when compared to an existing cascode-type circulator.

Furthermore, the circulator of one or more embodiments may be included as a component to configure a system of a computer including a general radio frequency (RF) module as well as a quantum computer, thereby uniformly implementing isolations higher than a certain level for a plurality of ports.

The QPUs, DAC/ADCs, multimode storage cavities, active circulators, qubits, structures, insulating layers, first electrode lines, second electrode lines, loop structures, Josephson junctions, dielectric layers, substrates, power sources, quantum computer systems, QRAMs, qubit elements, ports, power dividers, active filters, pairs, computer system 1100, processors, n-port active circulators, memories, n bit elements, QPU 110, DAC/ADC 115, multimode storage cavity 130, active circulator 150, qubits QB10, structure LL10, insulating layer NL10, first electrode line E10, second electrode line E20, loop structure P10, Josephson junction J10, loop structure P11, insulating layer NL11, Josephson junction J11, loop structure P11, dielectric layer D11, active circulator 300, substrate SUB11, power source V11, quantum computer system 400, QPU 410, circulator 430, QRAM 450, cavity 451, qubit element 453, power source 470, port 1 510, port 2 530, port 3 550, power dividers 610, 630, and 650, active filters 610 AF, 630 AF, and 650 AF, power dividers 810, 830, 850, and 870, and active filters 810AF, 830 AF, 850 AF, and 870 AF, pair 1010, computer system 1100, processor 1110, n-port active circulator 1130, memory 1150, power source 1170, n bit elements 1151-1 through 1151-*n*, and other apparatuses, devices, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An active circulator comprising:
an active filter; and
a power divider serially connected to the active filter,
wherein three or more combinations of the power divider serially connected to the active filter are connected to form a loop.

2. The active circulator of claim 1,
wherein the power divider comprises three ports.

3. The active circulator of claim 1,
wherein the power divider comprises one combining port and two dividing ports.

4. The active circulator of claim 1,
wherein the active filter comprises an operating amplifier and one or more capacitors.

5. The active circulator of claim 1,
wherein the active filter comprises an operating amplifier, one or more capacitors, and an attenuator.

6. The active circulator of claim 1,
wherein four pairs of the active filter and the power divider are connected in series to form a loop.

7. The active circulator of claim 1,
wherein the power divider comprises a Wilkinson power divider comprising three ports.

8. A quantum computer system comprising:
a power source;
a quantum processor unit (QPU) configured to generate a control signal;
the active circulator of claim 1; and
a quantum bit (qubit) element configured to selectively receive power from the power source via the active circulator and operate based on the control signal.

9. A quantum computer system comprising:
a power source;
a quantum processor unit (QPU) configured to generate a control signal;
an active circulator comprising three or more pairs of an active filter and a power divider combined in series are connected to form a loop; and
a plurality of quantum bit (qubit) elements configured to selectively receive power from the power source via the active circulator and operate based on the control signal.

10. The quantum computer system of claim 9,
wherein the power divider comprises three ports.

11. The quantum computer system of claim 9,
wherein the power divider comprises one combining port and two dividing ports.

12. The quantum computer system of claim 9,
wherein the active filter comprises an operating amplifier and one or more capacitors.

13. The quantum computer system of claim 9,
wherein the active filter comprises an operating amplifier, one or more capacitors, and an attenuator.

14. The quantum computer system of claim 9,
wherein four pairs of the active filter and the power divider are connected in series to form a loop.

15. The quantum computer system of claim 9,
wherein the power divider comprises a Wilkinson power divider comprising three ports.

16. A computer system comprising:
a power source;
a processor configured to generate a control signal;
an active circulator comprising three or more pairs of an active filter and a power divider combined in series are connected to form a loop; and
a plurality of bit elements configured to selectively receive power from the power source via the active circulator and operate based on the control signal.

17. The computer system of claim 16,
wherein the power divider comprises three ports.

18. The computer system of claim 16,
wherein the power divider comprises one combining port and two dividing ports.

19. The computer system of claim 16,
wherein the active filter comprises an operating amplifier and one or more capacitors.

20. The computer system of claim 16,
wherein the active filter comprises an operating amplifier, one or more capacitors, and an attenuator.

21. The computer system of claim 16,
wherein four pairs of the active filter and the power divider are connected in series to form a loop.

22. A quantum computer system comprising:
an active circulator comprising three or more combinations of power dividers and active filters alternatively connected in series to form a loop; and
a quantum bit (qubit) element configured to selectively receive power from the active circulator.

23. The quantum computer system of claim 22, wherein the loop comprising the active filters and the power dividers has a rotational symmetry of an order of three or more.

24. The quantum computer system of claim 22, wherein the power dividers comprise a first power divider, a second power divider adjacent to the first power divider in a direction of the loop, and a third power divider adjacent to the first power divider in another direction of the loop, and
in response to an input of the power the first power divider, the active circulator is configured to transmit the power to the second power dividers without transmitting the power to the third power divider.

25. The quantum computer system of claim 22, further comprising a quantum random access memory (QRAM) comprising a plurality of qubit elements including the qubit element.

26. The quantum computer system of claim 22, wherein the active filters and the power dividers comprise three or more pairs of an active filter and a power divider connected in series to form the loop.

* * * * *